May 12, 1970  A. N. GOREGLIAD  3,511,378
HEATING AND FILTERING APPARATUS FOR USE WITH SWIMMING POOLS
Filed Jan. 23, 1968  2 Sheets-Sheet 2

INVENTOR.
ARSENIUS N. GOREGLIAD
BY Seidel & Gonda
ATTORNEYS.

United States Patent Office 3,511,378
Patented May 12, 1970

3,511,378
HEATING AND FILTERING APPARATUS FOR USE WITH SWIMMING POOLS
Arsenius N. Goregliad, 157 Fernbrook Ave., Wyncote, Pa. 19095
Filed Jan. 23, 1968, Ser. No. 699,864
Int. Cl. B01d 35/18
U.S. Cl. 210—181                                12 Claims

ABSTRACT OF THE DISCLOSURE

A heating and filtering apparatus, suitable for use with swimming pools, is provided; and includes a filter bed, and a heater wherein filtered water is circulated in indirect heat exchange relation to a heat source and simultaneously provides thermal insulation for the heater, and wherein the water is counter-currently passed through tubular members passing close to the heat source for final heating.

---

This invention relates to heating and filtering apparatus for use with swimming pools, and more particularly, to a heating and filter apparatus comprising separate but interrelated heater and filter components.

To properly treat water for use in swimming pools, it is frequently necessary to filter and heat, in addition to providing the usual chemical treatment. Thus, filtration is used to remove floating and suspended particulate material, as well as filterable organisms, such as bacteria. It is also highly desirable to have the capability of heating the water in a desired range of temperature, thereby providing for maximum utilization and enjoyment of the pool.

Numerous constructions have heretofore been proposed for filtering and/or heating water in swimming pools, and it has even been proposed that filtration apparatus be physically combined with a heater to provide a unitary filtration and heating apparatus. See in this regard, Pat. 3,139,067.

It has been found that the use of separate components, that is, a separate filter, structurally and functionally interrelated with a heater, permits maximum operative efficiency of the individual units, lower cost of installation, lower weight of individual components and consequent ease of handling, and ease of service due to structural simplicity and interchangeability.

In view of the foregoing, it is an object of this invention to provide a heating and filtering apparatus for use with swimming pools.

It is another object of the invention to provide a heating and filtering apparatus wherein the heating and filtering components are contained in separate but interrelated units.

It is still another object of the invention to provide a novel apparatus including a heater wherein cool water is used as an insulating medium between the hotter parts of the heater and the ambient conditions.

It is still another object of the invention to provide a heating unit wherein gaseous fuel is efficiently burned to provide maximum heat output for transfer to the water.

It is a still further object of this invention to provide a heating and filtering apparatus having relatively cool external surfaces, pre-set means to automatically control the rate of fuel flow to the apparatus, and further means to cut off such flow if the temperature of the heater water becomes excessive.

It is yet another object of the invention to provide a heating and filtering apparatus wherein water is filtered and introduced through an annular passage wherein it serves as an insulating medium, and then to a heat transfer tube in direct counter current contact with a heat source to thereafter be returned to the swimming pool.

Other objects will appear hereinafter.

The foregoing and other objects are realized by a heating and filtering apparatus comprising separate filtration and heating components, the filtration component being a vessel having a filter bed and wherein suitable connection are provided for feeding to the filter the water to be treated and for backwashing the filter. The heating component includes a novel arrangement whereby water from the filter is slowly circulated in an outer annular passage, thereby providing effective thermal insulation between the other parts of the heater and ambient conditions. In the passage, the water is somewhat preheated, and it is then passed through heating coils, in close proximity to a heat source. The heat source of the present invention includes a converging-diverging nozzle, and means associated with the nozzle to ensure suitably turbulent flow adjacent thereto, thereby ensuring great heat output.

For the purpose of illustrating the invention there is shown in the drawings a form which is presently preferred; it being understood, however, that this invention is not limited to the precise arrangements and instrumentalities shown.

Figure 1:
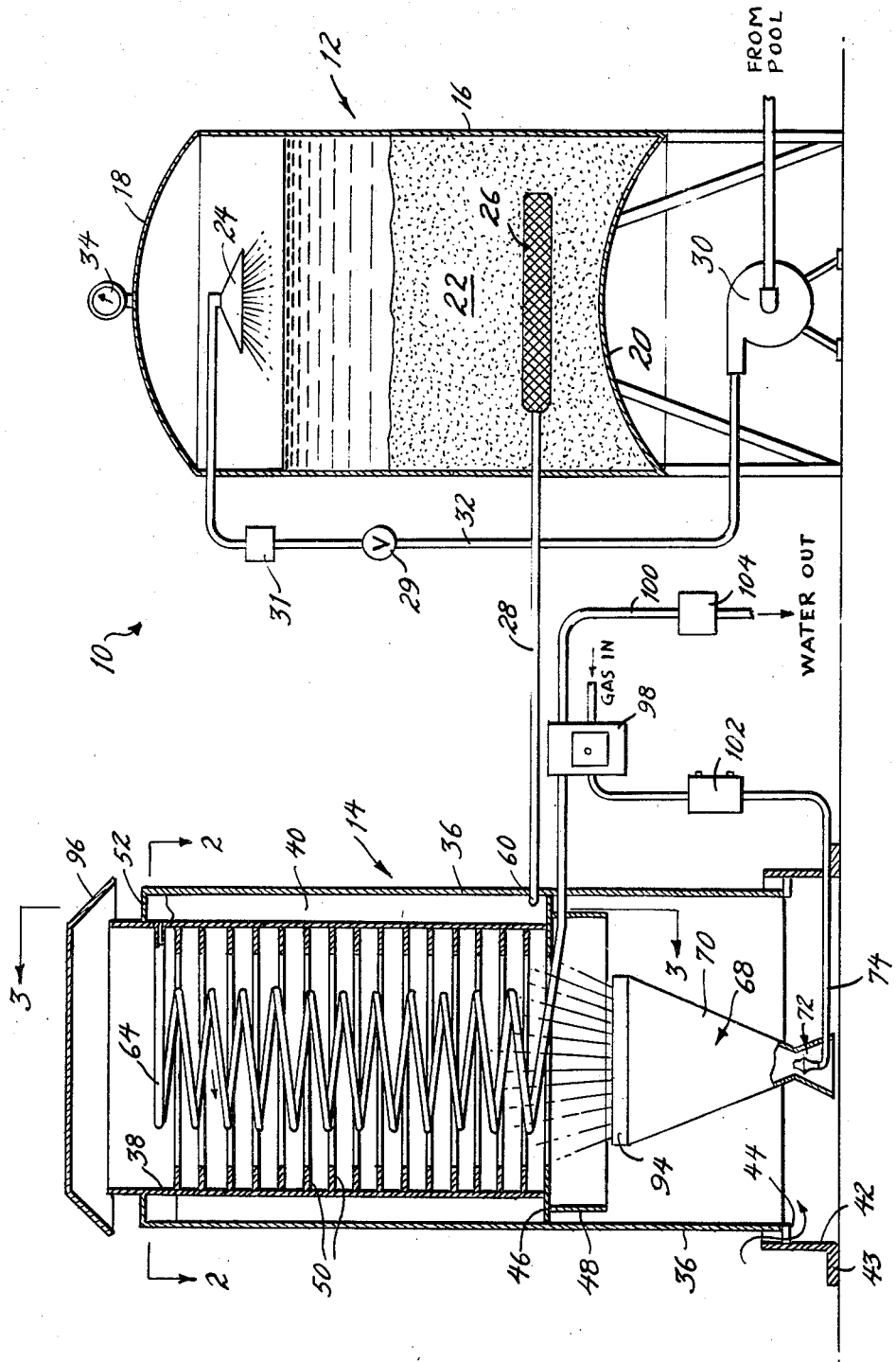
FIG. 1 is a sectional side elevation view through the apparatus.

Referring now to the drawings in detail, wherein like numerals indicate like elements, there is seen in FIG. 1 a heating and filtering apparatus, designated generally by the reference numeral 10, in accordance with the present invention. The apparatus 10 includes a filter unit designated generally by the reference numeral 12 and a heater unit designated generally by the reference numeral 14.

Turing first to the filter unit 12, there is provided a vessel 16 having dished end portions 18 and 20. The vessel 16 may be provided with a smooth and non-corrosive glass lining, not shown. Contained in the vessel 16 is a filtering medium 22, which may be sand or the like. A spray head 24 or other water dispensing device is provided in an upper portion of the vessel 16. A screen 26 of metal, ceramic or fabric provides an inlet for a transfer conduit 28, coupled in a manner to be further described later to the heater unit 14.

For filtration, water is dispensed by the spray head 24 over the top of the filtering medium 22. The medium 22 captures the filterable impurities and only filtered water passes from the vessel 16 through the transfer conduit 28. Conventional cleaning methods, such as backwashing, may be provided for in the filter unit 12. A valve 29 is provided to direct backwash flow, and a flow controller 31, responsive to the position of the valve 29 decreases flow during backwash to prevent upset of the bed.

A circulating pump 30, whose outlet is coupled to a conduit 32, feeds water from the pool to the spray head 24, and provides the pressure head necessary for the entire system. A pressure gauge 34 may be coupled to the end portion 18 or any other convenient portion of the vessel 16.

The heater unit 14 comprises an outer cylindrical shell 36, separated from a concentric inner shell 38 by vertically disposed baffles 40. A base ring 42, which rests on the ground or supporting brackets 43, includes inwardly directed support portions 44 for receiving the lower edge of the outer shell 36. Thus, the lower edge of the outer shell 36 is spaced from the base ring 42 and the areas between the inwardly directed portions 44 provide an annular air intake, for a purpose to be described later. Coupled to a medial portion of the outer shell 36 is a horizontally disposed baffle ring 46, and depending from the baffle ring 46 is an annular flame 48, the purpose of which will shortly be evident. Extending inwardly in a radial direction from the inner shell 38 is a series of fins 50, whose purpose will also be made apparent.

Figure 2:
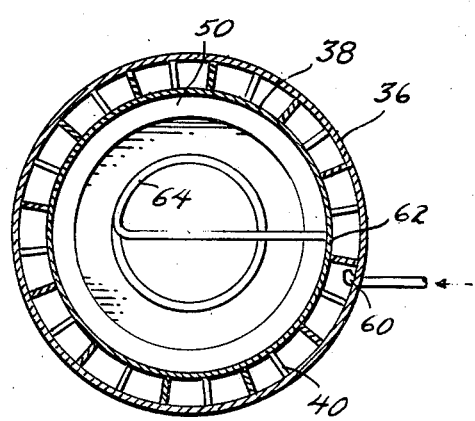
FIG. 2 is a sectional view taken along the line 2—2 in FIG. 1, showing details of the heating unit.
Figure 4:
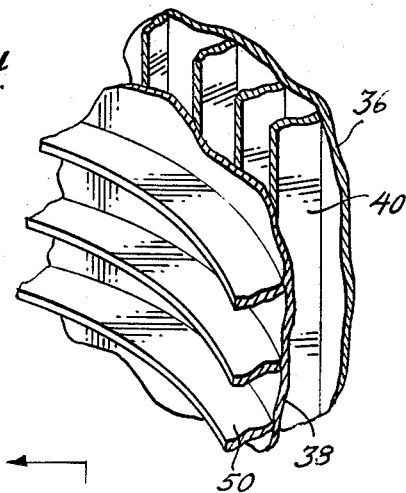
FIG. 4 is a fragmentary perspective view of the internal construction of the heating unit.
Figure 3:
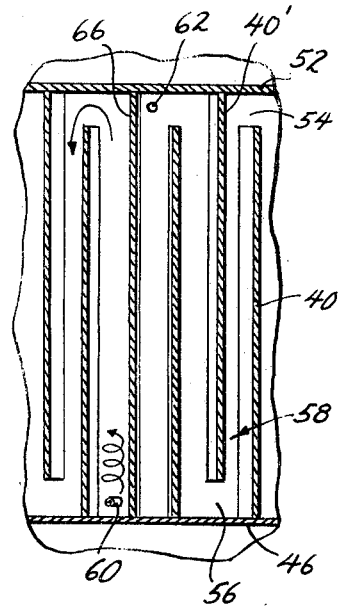
FIG. 3 is a sectional view taken along the line 3—3 in FIG. 1, showing further details of the heating unit.

Referring now to FIGS. 2 through 4, the arrangement of the vertical baffles 40 between the inner shell 38 and the outer shell 36 is apparent. As best seen in FIG. 3, an annular member 52 extends between the respective shells at an upper edge of the outer shell 36, and with the shells and the aforementioned horizontally disposed baffle ring 46 serves to define a closed annular water passage. The baffles 40 are shown extending axially of the passage, although they may be canted with respect to the central axis of the shells to thereby define portions of a helix. The baffles 40 do not extend the full distance between the member 52 and the baffle ring 46, but instead, alternate adjacent baffles 40 have lower and upper ends spaced from the annular closure member 52 and baffle ring 46, respectively. Referring to FIG. 3, the upper end of the baffle 40 is spaced from the annular closure member 52 to define a space 54, while the lower end of baffle 40' is spaced from the baffle ring 46 to define a space 56. The baffles 40, annular closure member 52 and baffle ring 46 therefore provide a labyrinth passage, which for convenience, may be designated generally by reference numeral 58.

A nozzle 60 disposed tangentially with respect to the shells 36 and 38 is provided within the labyrinth passage 58. The nozzle 60 is coupled to the previously mentioned transfer conduit 28, and therefore serves to introduce filtered water to the heater unit 14. The tangential flow direction provided by the nozzle 60 ensures a turbulent vortex flow within the labyrinth passage 58. The labyrinth passage 58 may be provided with a number of outlets 62 in communication with spiral heater tubes 64, disposed centrally of the inner shell 38. As used hereinafter, the area centrally of said shells may be referred to as a cavity. For the sake of clarity only one of the heater tubes 64 is illustrated. One or more full vertical walls 66 may be provided in the labyrinth passage 58 to prevent "short circuiting" of water entering the nozzle 60 to an outlet 62.

A burner designated generally by the reference numeral 68 is disposed within the confines of the inner shell 38, that is, within the cavity. The burner 68 includes a shroud 70 of converging-diverging cross-section, having its lower end spaced from the ground to provide for an air inlet. Within the shroud 70 is a fuel orifice 72. A fuel line supplies the orifice 72.

Figure 5:
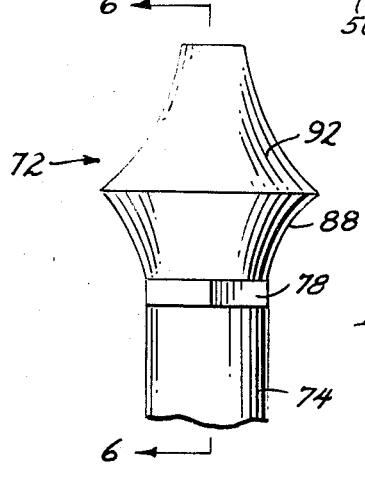
FIG. 5 is an enlarged detail view of a portion of FIG. 1.
Figure 6:
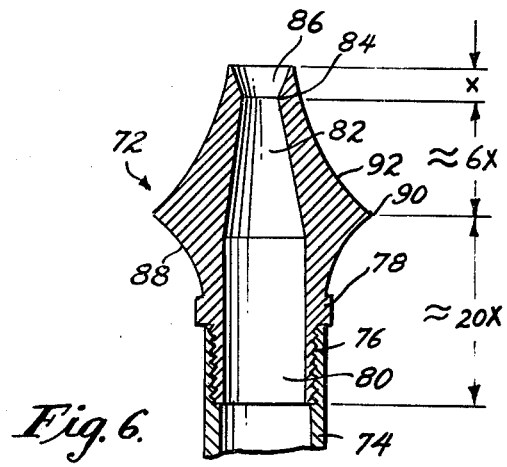
FIG. 6 is a sectional view taken along the line 6—6 in FIG. 5.

Referring now to FIGS. 5 and 6, the novel orifice in accordance with the present invention is seen in greater detail. The orifice 72 includes a threaded base 76 coupled to the line 74. A hexagonal section 78 may be provided to aid manipulation of the orifice 72 for installation. The base 76 includes a bore 80 of relatively large diameter. Fuel is received in the bore 80, and continues upwardly through a converging section 82, a throat 84 and a diverging section 86. The gaseous fuel is thus compressed and accelerated to the throat 84, and then expanded in the diverging section 86. The orifice 72 includes contoured outer surfaces which cooperate with the above-described nozzle configuration to maximize combustion effieciency. In this regard, there is provided a generally conical surface 88 of curved lateral profile and increasing cross-section intersecting at a sharp circular projection 90, a generally conical tapered surface 92, also of curved lateral profile, and decreasing cross-section. With such a configuration, air is drawn along the tapered surface 92 to mix with the gaseous fuel in the low pressure zone caused by the diverging section 86. The tapered surface 92 and sharp projection 90 tend to create turbulent flow, greatly enhancing fuel-air mixing. A sharp upper edge 93 where the diverging section 86 intersects the surface 92 also aids mixing. In an optimum configuration, the distance X from the edge 93 to the throat 84 is one-sixth the distance from the throat to the projection 90, and one-twentieth the distance from the projection 90 to the lower edge of the orifice. The shape of the shroud 70 directs the flow of air to the vicinity of the orifice 72 and aids in the creation of an updraft thereabout. The fuel-air mixture passes through slots or orifices in a ring 94 atop the shroud 70, and is there burned. The flame baffle 48 prevents loss of heat combustion directly to the outside shell 36, and also provides a measure of protection for the shell.

It will be apparent that water in the heater tubes 64 flows from the coolest to the hottest parts of the heater unit. Thus, the water is coolest at the top portion as seen in FIG. 1, and becomes increasingly heated as it reaches the bottom of the coil 64. This arrangement ensures the maximum temperature difference between the water and the surrounding conditions, and therefore maximizes heat transfer rates. The fins 50, heretofore described, aid heat transfer from the interior of the heating unit to the water circulating in the passage 58. The disposition of the fins 50 and baffle ring 46 ensures perpendicular flame contact, to maximize heat transfer rates.

The present novel heater results in constant circulation of all of the water, and therefore maximizes overall heat transfer. It will be recognized that the heater tubes 64 are in what is in effect the open "chimney" of the apparatus, and accordingly, chimney heat, frequently lost in prior art apparatus, is transferred to the water in the heater tubes 64. As seen in the drawings, the heater unit 14 may be provided with a chimney cap 96 to protect the interior from the elements. The chimney cap 96 is the only external part of the heater unit subjected to any significant degree of heating, and even it can be safely touched by hand. The water in the passage 48, in vortex flow and circulating around the baffles 40 provides an effective insulation against heat loss through the outer shell 36. Thus, the large amount of heat generated by the above-described novel burner is conserved, and to a greater extent than heretofore thought possible, applied to the useful purpose of heating water.

Another safety feature of the present invention is the manner in which the water outlet temperature can be selected, and the apparatus providing for automatic shut-off of the fuel supply in the event of excessive outlet temperature. There is provided in this regard, a thermostatically-controlled cut-off valve 98. A water discharge conduit 100 passes through the cut-off valve 98, and the temperature is therein sensed in any well-known manner, such as by a thermocouple or bimetallic element. Excessive temperature results in operation of the valve 98 and fuel shut off. Normal temperature control is accomplished by a temperature selector 102, shown diagrammatically, and also of a known type. The temperature selector 102 regulates the flow of fuel in the conduit 74 in response to temperature sensing in a known manner. A pressure regulator and pressure relief valve 104 is provided in the conduit 100 to maintain pressure in the system, and to bleed off such pressure, if and when it becomes excessive.

The present invention may be embodied in other specific forms without departing from the spirit or essential attributes thereof and, accordingly, reference should be made to the appended claims, rather than to the foregoing specification as indicating the scope of the invention.

I claim:

1. Heating and filtering apparatus for water comprising a filter body, a heater coupled to said filter body, said heater comprising an annular outer water passage, generally vertically disposed baffles in said passage, said baffles directing the flow of water in said passage in a vertical direction, an outlet from said filter in communication with said passage, a cavity disposed centrally of said annular water passage, a heat source in said cavity, and conduit means in said cavity and in fluid communication with said passage for conducting water from said passage and through said cavity so that the water receives heat from said heat source.

2. Heating and filtering apparatus in accordance with claim 1, wherein said outlet includes a nozzle disposed to eject water into said passage in a tangential direction to create a turbulent vortex flow therein.

3. Heating and filtering apparatus in accordance with claim 1, wherein said passage is defined by inner and outer claim 3, and inwardly directed vertically spaced fins extending between said shells, and opposite ends of successive adjacent baffles being spaced from said end walls to define a labyrinth passage.

4. Heating and filtering apparatus in accordance with claim 3, and inwardly directed vertically spaced fin extending into said cavity and coupled to an inner wall of said passage.

5. A water heater for swimming pools comprising an elongated annular outer water passage, a water inlet in communication with said passage, a cavity disposed centrally of said water passage, generally axially disposed baffles in said passage for directing the flow of water in said passage in an axial direction, said inlet including a nozzle disposed to eject water into said passage in a tangental direction to create turbulent vortex flow between said baffles, a heat source in said cavity, and conduit means in said cavity and in fluid communication with said passage for conducting water from said passage and through said cavity in heat transfer relation with said heat source.

6. A water heater in accordance with claim 5, and axially spaced, radially extending fins coupled to an inner wall of said passage and extending into said cavity.

7. A water heater in accordance with claim 5, said heat source comprising a gas orifice having a converging-diverging nozzle profile, outer air-flow controlling surfaces on said nozzle, said outer surfaces comprising first and second generally conical surfaces intersecting at a common base thereof, one of said surfaces having an edge of smaller cross-section than the common base intersecting the diverging portion of said nozzle profile.

8. A water heater in accordance with claim 5 wherein said heat source is a gas burner, means for sensing the temperature of water leaving said heater, a fuel conduit for said burner, means coupled to said fuel conduit for controlling fuel flow in said conduit, and means responsive to said sensing means coupled to said means associated with said fuel conduit, whereby the heat output of said heat source is controlled in response to said sensing means.

9. A water heater in accordance with claim 8 and means coupled to said fuel conduit for cutting the flow of fuel in said conduit responsive to excessive temperature of the water leaving said heater.

10. A water heater in accordance with claim 5 wherein said conduit means are arranged to conduct water through said cavity in counter current flow from a cooler to a hotter area of the cavity.

11. Heating and filtering apparatus for water comprising a filter unit, and a heater coupled to said filter unit, said heater comprising an annular outer water passage, a cavity disposed centrally of said annular water passage, a heat source in said cavity, and conduit means in said cavity and in fluid communication with an upper portion of said passage for conducting water from said passage and through said cavity, said filtering unit comprising a pressure vessel separate from said heater, and a filter medium in said pressure vessel, a transfer conduit in fluid communication with said pressure vessel and a lower portion of said passage, fluid pressure means for injecting water into a portion of said pressure vessel and for pressurizing said vessel to cause the water to pass through the filter medium and to flow through said transfer conduit, said passage and said conduit means, said heat source being disposed adjacent the lower portion of said passage and said conduit means so that relatively cool water from said transfer conduit enters said passage adjacent said heat source and water is conducted by said conduit means from a cooler to a hotter area of said cavity.

12. Heating and filtering apparatus in accordance with claim 11, said heat source comprising a gas orifice having a converging-diverging nozzle profile, outer air flow controlling surfaces on said nozzle, said outer surfaces comprising first and second generally conical surfaces intersecting at a common base thereof, one of said surfaces having an edge of smaller cross-section than the common base intersecting the diverging portion of said nozzle profile.

References Cited

UNITED STATES PATENTS

| 1,835,329 | 12/1931 | Peters | 122—169 |
| 1,980,425 | 11/1934 | Morgan | 122—169 |
| 2,737,169 | 3/1956 | Kimberlin. | |
| 2,860,917 | 11/1958 | Thompson. | |
| 2,979,733 | 4/1961 | Saint Clair et al. | 210—169 X |
| 3,130,920 | 4/1964 | Devillard | 239—601 |
| 3,139,067 | 6/1964 | Van Den Broek et al. | 122—18 |
| 3,198,442 | 8/1965 | Brenner | 239—601 |
| 3,428,559 | 2/1969 | McInnis | 126—359 |

FREDERICK L. MATTESON, JR., Primary Examiner

R. A. DUA, Assistant Examiner

U.S. Cl. X.R.

122—169